United States Patent [19]

Stewart et al.

[11] Patent Number: 4,521,976
[45] Date of Patent: Jun. 11, 1985

[54] METHOD OF OPERATING A FLUIDIZED BED HEAT EXCHANGER UTILIZING INDUCED CIRCULATION

[75] Inventors: Robert D. Stewart, Verona; Robert L. Gamble, Wayne, both of N.J.

[73] Assignee: Foster Wheeler Energy Corporation, Livingston, N.J.

[21] Appl. No.: 555,119

[22] Filed: Nov. 25, 1983

Related U.S. Application Data

[62] Division of Ser. No. 322,310, Nov. 17, 1981, Pat. No. 4,446,629.

[51] Int. Cl.³ .............................................. F26B 3/08
[52] U.S. Cl. ...................................... 34/10; 34/57 A; 34/57 E
[58] Field of Search ....................... 34/57 A, 57 E, 10; 110/245; 122/4 D; 432/15, 58

[56] References Cited

U.S. PATENT DOCUMENTS

| | | |
|---|---|---|
| 2,975,037 | 3/1961 | Lake . |
| 3,463,617 | 8/1969 | Takeuchi . |
| 3,818,846 | 6/1974 | Reese . |
| 3,897,739 | 8/1975 | Goldbach . |
| 4,035,152 | 7/1977 | Yang et al. . |
| 4,085,707 | 4/1978 | Moss . |
| 4,107,851 | 8/1978 | Takacs . |
| 4,240,364 | 12/1980 | Bryers et al. . |
| 4,335,661 | 6/1982 | Stewart et al. . |
| 4,349,969 | 9/1982 | Stewart et al. . |

Primary Examiner—Larry I. Schwartz
Attorney, Agent, or Firm—Marvin A. Naigur; John E. Wilson; Warren B. Kice

[57] ABSTRACT

A method of operating a fluidized bed heat exchanger in which a perforated plate is disposed within a housing for supporting a bed of particulate material which is introduced into the housing through an inlet. Air is passed through the plate to fluidize the particulate material and a drain pipe is provided for discharging the spent material from the bed. The flow rate of air introduced into the bed is increased in a direction across said bed from said inlet to said drain pipe to promote the circulation of the bed materials from the inlet to the drain pipe.

1 Claim, 3 Drawing Figures

METHOD OF OPERATING A FLUIDIZED BED HEAT EXCHANGER UTILIZING INDUCED CIRCULATION

This is a division of application Ser. No. 322,310, filed Nov. 17, 1981 now U.S. Pat. No. 4,446,629.

BACKGROUND OF THE INVENTION

This invention relates to a method of operating a fluidized bed heat exchanger and, more particularly, to such a method a heat exchanger in which heat is generated by the combustion of particulate fuel in a fluidized bed.

The use of fluidized beds has long been recognized as an attractive way of generating heat. In a normal fluidized bed arrangement, air is passed through a perforated plate, or grid, which supports a bed of particulate material, usually including a mixture of fuel material, such as high sulfur bituminous coal, and an adsorbent material for the sulfur released as a result of the combustion of the coal. As a result of the air passing through the bed, the bed behaves like a boiling liquid which promotes the combustion of the fuel. In addition to enjoying a capability for considerably reducing the amount of sulfur-containing gases introduced to the atmosphere, such as arrangement permits relatively high heat transfer rates, substantially uniform bed temperatures, combustion at relatively low temperatures, a reduction in corrosion and boiler fouling and a reduction in boiler size.

In the fluidized bed combustion process, the coal and adsorbent are continuously introduced into the bed by suitable feeders, injectors, or the like and the spent coal and adsorbent are discharged from the lower portion of the bed, usually through a gravity drain pipe extending through a wall of the heat exchanger or through a discharge opening formed through the perforated support plate. However, in these type of arrangements, there is only a minimal number of feeders or injectors, which are usually mounted through the heat exchanger walls, which results in non-homogeneous distribution and mixing of the particulate material in the bed and therefore an insufficient residence time and a reduced efficiency. This problem is specially acute in connection with the use of particulate coal of high reactivity, such as lignite, and/or relatively fine size particles (smaller than ⅛ inch), and/or low density particles, all of which require good mixing and distribution for maximum efficiency.

SUMMARY OF THE INVENTION

It is therefore an object of the present invention to provide a method of operating a fluidized bed heat exchanger in which an improved mixing and distribution of the bed material in the bed is achieved in a relatively inexpensive and simple manner.

It is a further object of the present invention to provide a method of the above type in which the bed material is circulated within the bed in a direction from the inlet to the drain, in such a manner as to provide sufficient residence time to permit larger particles to react in the bed so as to minimize their loss in the drain.

It is a further object of the present invention to provide a method of the above type in which circulation of the bed materials is induced by introducing air at varying flow rates to different sections of the bed to impart momentum to the bed materials and cause circulation in the desired direction.

It is a still further object of the present invention to provide a method of the above type in which a plurality of directional fluidization nozzles are provided which direct the fluidization air into the bed.

Toward the fulfillment of these and other objects, the flow rate of air introduced through the perforations in the plate which supports the bed of particulate material is increased across said bed in a direction from the material inlet to the bed drain to induce circulation of the bed material within the bed in a manner to insure an optimum distribution and mixing of the material.

DESCRIPTION OF THE DRAWINGS

The above brief description, as well as further objects, features and advantages of the present invention will be more fully appreciated by reference to the following detailed description of the presently preferred but nonetheless illustrative embodiment in accordance with the present invention when taken in conjunction with the accompanying drawings in which.

DESCRIPTION OF THE PREFERRED EMBODIMENT

Figure 1:
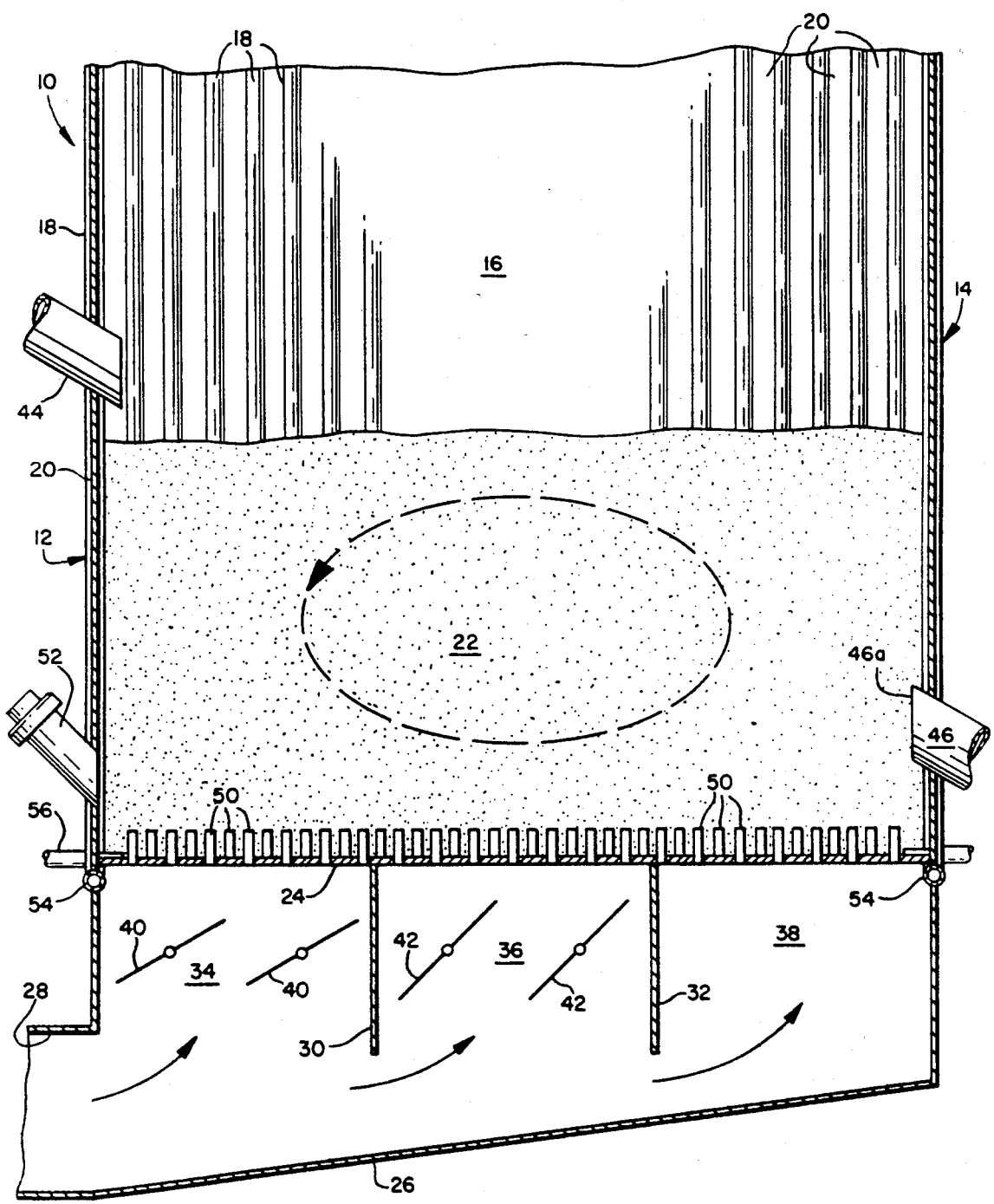
FIG. 1 is a vertical sectional view of a fluidized bed heat exchanger operated in accordance with the method of the present invention.

Referring to FIG. 1 of the drawings, the reference numeral 10 refers in general to an enclosure forming a major portion of a fluidized bed heat exchanger which may be in the form of a boiler, a combustor, a process reactor or any similar type device. The enclosure 10 consists of a front wall 12, a rear wall 14, and two sidewalls 16, one of which is shown in FIG. 1. According to the exemplary embodiment shown, each wall is formed by a plurality of vertically-extending tubes 18 disposed in a spaced, parallel relationship and connected together by a plurality of elongated fins 20 extending for the entire lengths of the tubes and connected to diametrically opposed surfaces of the tubes in a conventional manner. The upper portion of the enclosure 10 is not shown for the convenience of presentation, it being understood that it consists of a convection section, a roof and an outlet for allowing the combustion gases to discharge, also in a conventional manner.

A bed of particulate material, shown in general by the reference numeral 22 is disposed within the enclosure 10 and rests on a perforated plate 24 extending horizontally in the lower portion of the enclosure. The bed 22 can consist of a mixture of discrete particles of fuel material such as bituminous coal, and an adsorbent, such as limestone, for adsorbing the sulfur released by the combustion of the fuel material.

An air plenum 26 is provided immediately below the plate 24 and an inlet 28 is provided through the plenum for distributing pressurized air from an external source. Two partitions 30 and 32 are provided in the plenum 26 and divide the plenum into three sections 34, 36 and 38.

A pair of dampers 40 are adjustably mounted in the plenum section 34 and a pair of dampers 42 are adjustably mounted in the plenum section 36. The dampers 40 and 42 are of a conventional design and function to vary the flow rate of air (in terms of pounds per hour, or the like) through the plenum sections 34 and 36 respectively, with the dampers being set so that the flow rate through the section 36 is less than that through the section 38 and greater than that through the section 34, for reasons that will be explained in detail later.

An overbed feeder 44 extends through the front wall 12, receives particulate coal from inlet ducts or the like (not shown), and is adapted to feed the coal particles onto the upper surface of the bed 22. The feeder 44 can operate by gravity discharge or can be in the form of a spreader-type feeder or any other similar device. It is understood that a feeder can also be provided for discharging an adsorbent onto the bed 22, and would be constructed and arranged in a manner similar to the feeder 44.

A drain pipe 46 extends through the wall 14 and has an inlet end portion 46a that registers with the interior of the enclosure 10 in communication with the lower portion of the bed 22. The pipe 46 is thus adapted to receive the spent bed material as it migrates downwardly in the bed and functions to discharge the material from the enclosure 10 by gravity to a screw cooler, conveyor belt, or the like (not shown).

A plurality of air distributors, or nozzles, 50 communicate with the perforations through the plate 24, respectively, with each nozzle being in the form of a vertically disposed tubular member which is secured to the plate in any conventional manner, such as by bolting or welding, and which extends upwardly from the plate 24 for a predetermined distance into the bed 22. Air from the plenum 26 thus enters the lower end portions of the nozzles 50 and discharges from the upper end portions into the bed 22. The air ultimately rises in the enclosure 10 and discharges, along with the gaseous products of combustion, from an outlet (not shown) in the upper portion of the enclosure 10. The bed material extending above the nozzles is fluidized by the air as it takes part in combustion of fuel from the feeder 44. Also, a dormant layer of particulate material is formed around the vertical portions of the nozzles 50 which acts to insulate the plate 24 from the heat generated in the heat exchanger extending above the nozzles.

The nozzles 50 are evenly spaced across the plate 24 with the nozzles of each row being offset from the nozzles of an adjacent row. The flow rate of air from the plenum 26 to the nozzles 50 is varied by selectively controlling the position of the dampers 40 and 42 and, therefore, the flow rate through the plenum sections 34 and 36 respectively. More particularly, the dampers 34 and 36 are normally positioned approximately as shown in FIG. 1 with the flow rate through the section 34 being less than that through the section 36. Since the flow rate through the section 36, in turn, is less than that through the section 38 (which has no dampers), it can be appreciated that the flow rate of air passing through the nozzles 50 and into the bed 22 increases in a direction from left to right, as viewed in FIG. 1, or in a direction from the feeder 44 to the drain pipe 46. This induces a circulation of the bed material in a direction from the feeder 44 to the drain pipe 46 and thus insures superior distribution and mixing of the particulate material, as will be explained in greater detail later.

A bed light-off burner 52 is provided through the front wall 12 immediately above the plate 24 for initially lighting off the bed during startup in a conventional manner. A pair of horizontal headers 54 are connected in fluid communication with the tubes 18 forming the front wall 12 and the rear wall 14, respectively, and another pair of horizontal headers 56 are connected in fluid communication with the tubes 18 forming the sidewalls 16. It is understood that headers similar to the headers 54 and 56 are provided in communication with the upper ends of the walls 12, 14 and 16. As a result, a fluid to be heated can be sequentially or simultaneously passed through the walls 12, 13 and 16 to pick up the heat from the fluidized bed in a conventional manner.

In operation, pressurized air is introduced into the plenum inlet 28 and passes up through the plenum 26 and into the plenum sections 34, 36 and 38. The air flows upwardly through the plenum sections 34, 36 and 38 and into the nozzles 50 with the flow rate through the sections 34 and 36 being under control of the dampers 40 and 42, respectively. The air then passes through the nozzles 50 and discharges into the bed 22 at a plane above the plate of the plate 24. The dampers 40 and 42 are adjusted to the approximate relative positions shown so that the flow rate of air through the plenum section 34 is less than that through the section 36. Since there are no dampers in the section 38, it can be appreciated that the flow rate of the air introduced into the bed 22 increases, and the density of the bed particles decreases, in a direction from the front wall 12, where the feeder 44 is located to the rear wall 14, where the drain pipe 46 is located. As a result of this variation in density of the bed material across the bed, that portion of the particulate material in the bed 22 extending immediately above the nozzles 50 in the lower bed portion is fluidized in a manner to induce a circulation of the bed material from the feeder 44 towards the drain pipe 46, while the particulate material in the upper bed portion tends to circulate in an opposite direction as shown by the dashed flow arrow in FIG. 1.

The light-off burner 52 is then fired to heat the material in the bed until the temperature of the material reaches a predetermined level, and additional particulate fuel and adsorbent material are discharged onto the upper surface of the bed 22 as needed.

After the bed 22 has been fluidized and has reached a predetermined elevated temperature in accordance with the foregoing, the light-off burner 52 is turned off while the feeder 44 continues to distribute particulate fuel to the upper surface of the bed in accordance with the predetermined feed rates. As a result of the foregoing, and especially the introduction of the fluidizing air into the bed at varying flow rates to vary the density of the bed, a superior mixing and distribution of the particulate material is achieved due to the momentum imparted to the bed material and the improved circulation of the latter within the bed. This increases the residence time of the particulate materials and thus considerably improves the reaction efficiency. Also, the layer of particulate material extending between the upper surface of the plate 24 and the upper ends of the nozzles 50 is relatively dormant and thus acts as an insulator for the plate 24.

Fluid, such as water, to be heated is passed into the headers 54 and 56 where it passes simultaneously, or in sequence, through the tubes 18 forming the walls 12, 14 and 16 to add heat from the fluidized bed to the fluid before it is passed to external apparatus for further processing.

Figure 2:
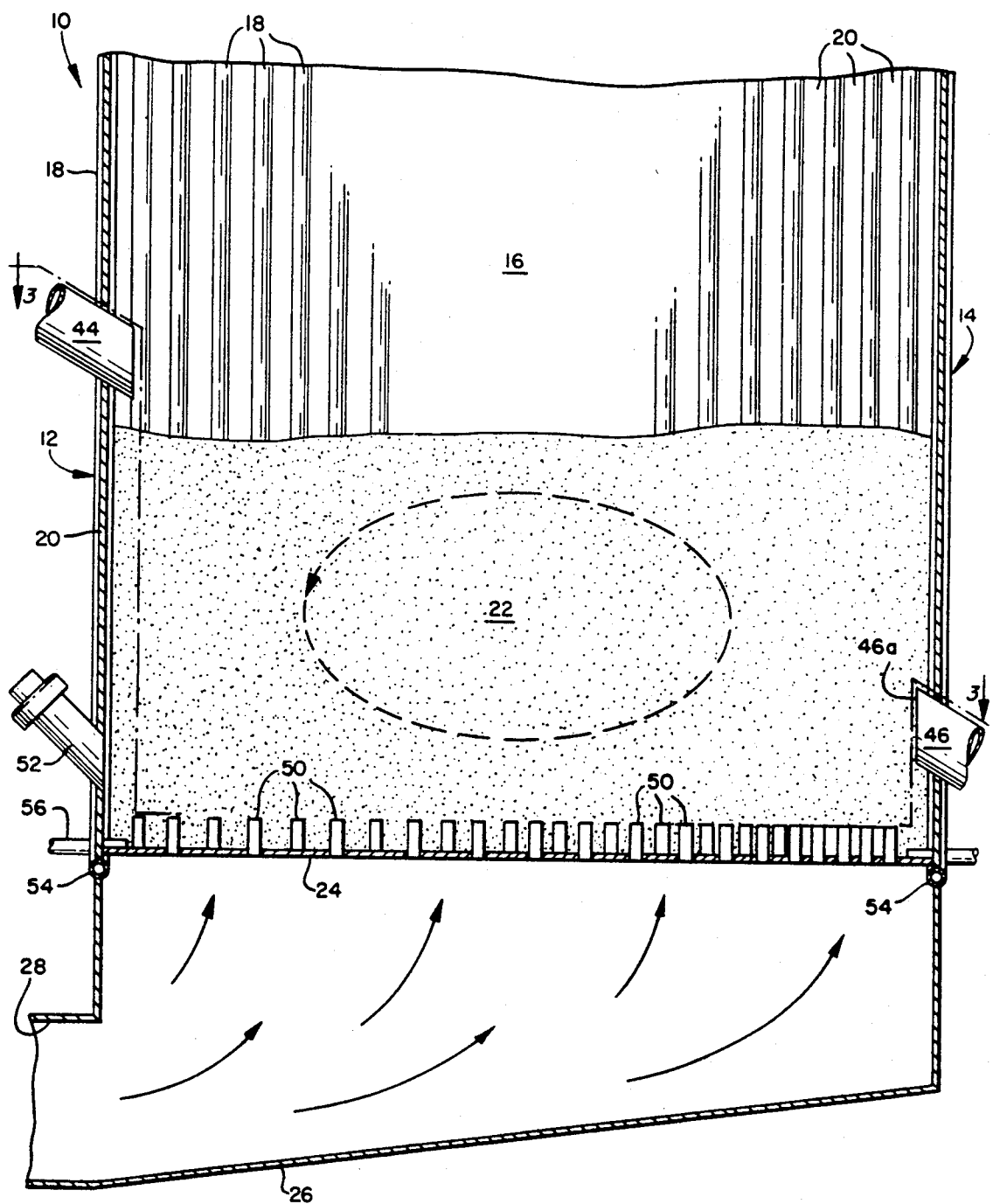
FIG. 2 is a view similar to FIG. 1 but depicting an alternate embodiment of the fluidized bed heat exchanger of the present invention.
Figure 3:
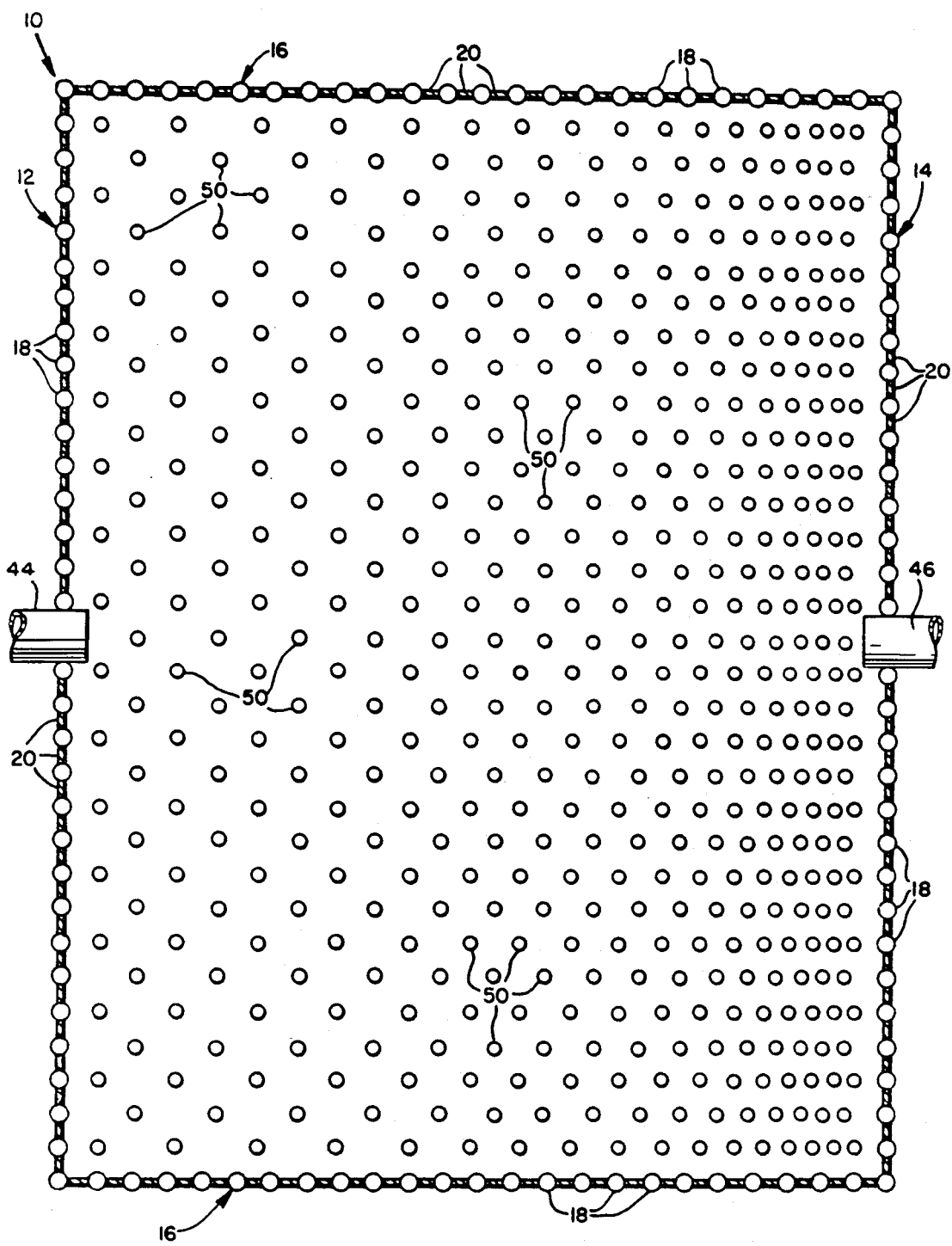
FIG. 3 is a reduced plan view of the heat exchanger of FIG. 2 with the bed material omitted in the interest of clarity.

The embodiment of FIGS. 2 and 3 is similar to that of the embodiment of FIG. 1 and identical components have been given the same reference numerals. According to the embodiment of FIGS. 2 and 4, the partitions 34, 36 and 38 along with the dampers 40 and 42 have been eliminated and the spacing of the perforations through the plate 24 and the resultant spacing of the nozzles 50 have been changed. More particularly, the spacing between the perforations and, therefore, between the nozzles 50 decreases in a general left-to-right direction as viewed in FIGS. 2 and 3, i.e., in a direction between the front wall 12, where the feeder 44 is located and the rear wall 14, where the drain pipe 56 is located. Thus, the number of perforations and nozzles 50 and the resultant flow rate of air introduced into the bed 22 increases and the density of the bed decreases in the same direction. Thus, a momentum is imparted to the bed material in a manner similar to that of the previous embodiment, which induces a circulation of the materials in the direction shown by the dashed flow arrow in FIG. 2 and thus insures an improved distribution, mixing and residence time of the particulate material.

It is understood that variations in the above arrangements can be made without departing from the scope of the invention. For example, the nozzles can take a different configuration from that discussed above, and the number and specific locations of the nozzles can be varied as long as the above objectives and results are achieved. Also a bank, or series, of heat exchange tubes can be provided in the enclosure 10 for circulating water in a heat exchange relationship with the bed 22 in a conventional manner.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed is:

1. A method of operating a fluidized bed heat exchanger comprising the steps of supporting a bed of particulate material on a perforated grate, introducing additional particulate material to a first portion of said bed, discharging spent bed material from a second portion of said bed, and introducing air, via nozzles associated with the perforations in said grate, into both of said portions of said bed to fluidized said bed, the number of perforations formed through said plate, and the number of nozzles, increasing in a direction across said plate from said first bed portion to said second bed portion to vary the flow rate of air introduced into said first bed portion from the flow rate of air introduced into said second bed portion.

* * * * *